United States Patent [19]

Kittle

[11] Patent Number: 4,549,448

[45] Date of Patent: Oct. 29, 1985

[54] DIFFERENTIAL LOCK CONTROL SYSTEM RESPONSIVE TO A PLURALITY OF VEHICLE PARAMETERS

[75] Inventor: Carl E. Kittle, Cedar Falls, Iowa

[73] Assignee: Deere & Company, Moline, Ill.

[21] Appl. No.: 503,968

[22] Filed: Jun. 13, 1983

[51] Int. Cl.⁴ .......................................... F16H 1/44.5
[52] U.S. Cl. ...................... 74/710.5; 74/710; 74/713
[58] Field of Search ............... 74/710, 710.5, 711, 74/713, 752 A, 752 C, 752 D, 866; 192/4 A

[56] References Cited

U.S. PATENT DOCUMENTS

| | | |
|---|---|---|
| 2,722,134 | 11/1955 | Cobell .................................. 74/472 |
| 2,803,150 | 8/1957 | Fisher .................................. 74/710.5 |
| 2,830,670 | 4/1958 | Ferguson .......................... 74/710.5 X |
| 2,874,790 | 2/1959 | Hennessey .......................... 180/6.2 |
| 2,934,975 | 5/1960 | Algie .................................. 74/650 |
| 3,133,454 | 5/1964 | Padlo .................................. 74/710.5 |
| 3,138,970 | 6/1964 | Costa et al. ......................... 74/711 |
| 3,292,720 | 12/1966 | Harvey .............................. 180/6.2 |
| 3,400,610 | 9/1968 | Taylor et al. ...................... 74/710.5 |
| 3,439,785 | 4/1969 | Hughson ......................... 74/710.5 X |
| 3,446,320 | 5/1969 | Schott .................................. 192/4 |
| 3,463,277 | 8/1969 | Allori et al. ......................... 192/4 |
| 3,467,212 | 9/1969 | Doll .................................. 180/6.2 |
| 3,498,427 | 3/1970 | Bingley .............................. 192/13 |
| 3,640,360 | 2/1972 | Dollase .............................. 192/4 A |
| 3,642,103 | 2/1972 | Schott .............................. 192/4 A |
| 3,732,752 | 5/1973 | Louckes et al. .................. 74/710.5 |
| 3,788,166 | 1/1974 | Hart et al. ......................... 74/710.5 |
| 3,845,671 | 11/1974 | Sharp et al. ...................... 74/710.5 |
| 3,871,249 | 3/1975 | Jeffers .............................. 74/711 |
| 3,945,475 | 3/1976 | Khatti ......................... 74/710.5 X |
| 3,974,717 | 8/1976 | Breed et al. ...................... 74/713 |
| 4,113,044 | 9/1978 | Williams et al. ............ 74/710.5 X |
| 4,156,547 | 5/1979 | Marsh .......................... 74/711 X |
| 4,218,938 | 8/1980 | Hattori .............................. 74/710.5 |
| 4,347,760 | 9/1982 | Jewett .............................. 74/710.5 |

Primary Examiner—Rodney H. Bonck
Assistant Examiner—Dwight G. Diehl

[57] ABSTRACT

A differential lock control system includes an hydraulically-operated differential lock operated by a solenoid valve. Energization of the solenoid valve is controlled by a circuit which includes a normally open latching relay and series-connected switches which open and unlock the differential in response to sensed vehicle speed and brake application. The differential may be locked by closing a normally open momentary contact switch. A multiple relay circuit is coupled to the latching relay and is operable to automatically re-lock the differential when certain conditions relating to vehicle functions, such as steering pressure, wheel slip and draft force, are met.

13 Claims, 2 Drawing Figures

DIFFERENTIAL LOCK CONTROL SYSTEM RESPONSIVE TO A PLURALITY OF VEHICLE PARAMETERS

BACKGROUND OF THE INVENTION

This invention relates to a control system which controls the locking and unlocking of a differential gear mechanism.

It is well known to provide vehicles, such as farm tractors, with differentials which can be selectively locked or unlocked. In a simple form, differential lock control systems are in use wherein a solenoid-operated differential lock control valve is controlled by a single, manually-operated floor switch. However, with such a system, the vehicle operator must continuously depress the floor switch in order to keep the differential locked. On both row crop and four-wheel drive (4WD) tractors with differential locks, a locked differential can interfere with the steering of the tractor. One solution to this problem, usually applied to row crop tractors, has been to unlock the differential in response to a left or right wheel brake application since the brakes are often used to assist the turning of a row crop tractor. Such a system is described in U.S. Pat. No. 2,874,790 (Hennessey).

Another solution to this problem has been to control the locking of the differential as a function of the relative angle between mechanical components of the tractor steering system. An example of this is also shown in the Hennessey patent. Another example of a steering angle differential lock control system may be found in co-pending U.S. Patent Application, Ser. No. 503,969, filed June 13, 1983, and assigned to the assignee of the present invention. However, in the Hennessey system, the differential can be both locked and unlocked by operation of a steering angle sensitive switch. In the system described in Application, Ser. No. 503,969, both the brake and steering-responsive switches are operable to unlock, but not to lock, the differential. Accordingly, it would be desirable to have a differential lock control system for a tractor wherein brake application is operable only to unlock the differential and wherein a steering-responsive device is operable only to re-lock the differential. Furthermore, it would be desirable to control the unlocking and re-locking of the differential as a function of additional vehicle operational conditions, such as wheel slip, vehicle speed and draft force.

SUMMARY OF THE INVENTION

An object of the present invention is to provide a differential lock control system which responds to a first vehicle function by only unlocking the differential and which responds to a second vehicle function by only re-locking the differential.

Another object of the present invention is to provide a differential lock control system which responds to vehicle functions other than steering and braking.

These and other objects are achieved by the present invention which includes an hydraulically-operated differential lock operated by a solenoid valve. Energization of the solenoid valve is controlled by a circuit which includes a normally open latching relay and series-connected switches which open and unlock the differential in response to sensed vehicle speed and brake application. The differential may be locked by closing a normally open momentary contact switch. A multiple relay circuit is coupled to the latching relay and is operable to automatically re-lock the differential when certain conditions relating to vehicle functions, such as steering pressure, wheel slip and draft force, are met.

DETAILED DESCRIPTION

Figure 1:
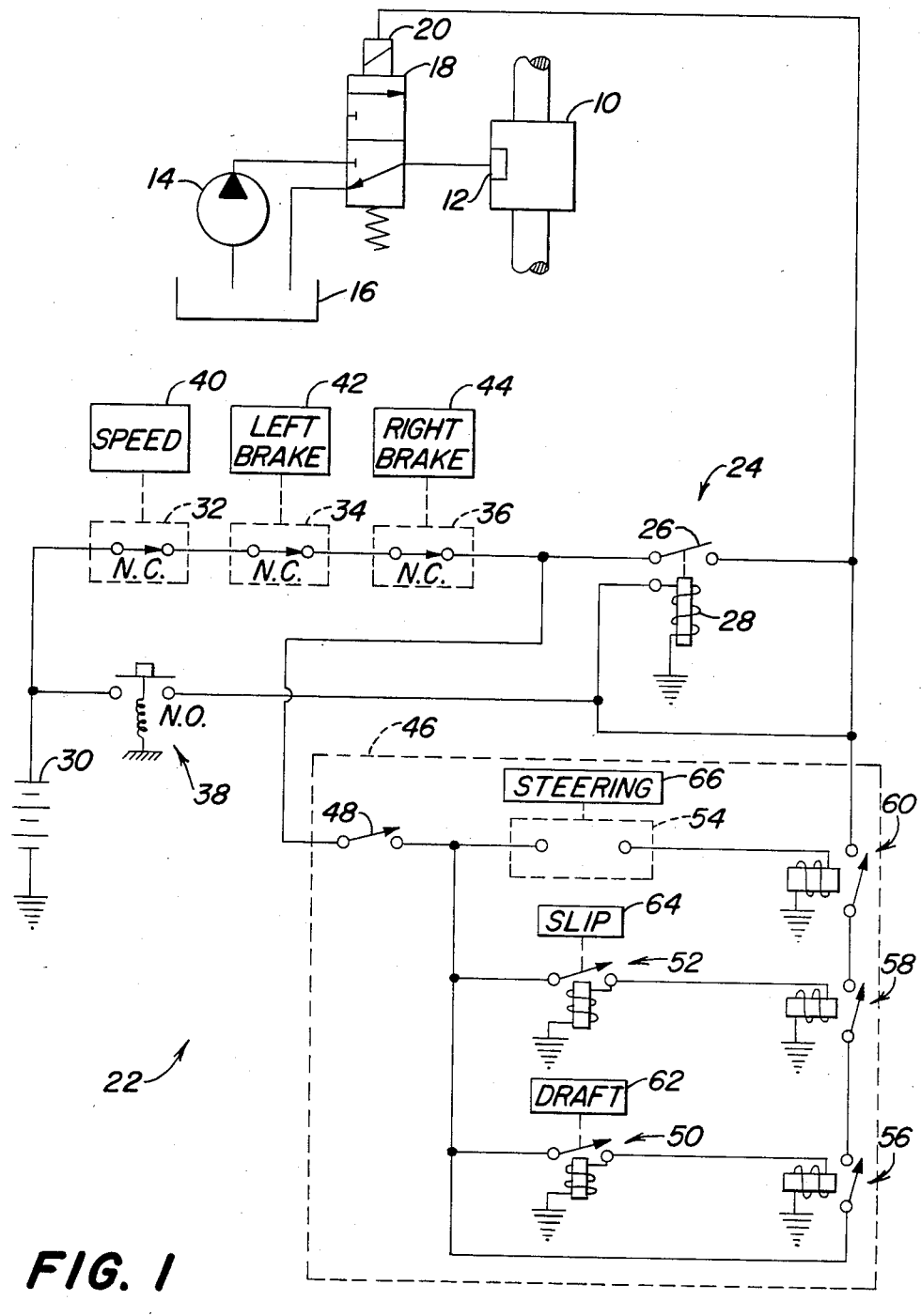
FIG. 1 is a simplified schematic diagram of a differential lock control system constructed according to the present invention.

The power train of an agricultural tractor includes a differential 10 with a conventional hydraulically-operated locking mechanism 12, such as described in U.S. Pat. No. 3,292,720. Fluid communication between the lock 12, a pump 14 and a reservoir 16 is controlled by a solenoid-operated, 2-way, 2-position valve 18. The solenoid 20 of valve 18 is controlled by a differential lock control circuit 22.

Control circuit 22 includes a latching relay 24 which has a normally open relay switch 26 which can be closed by energizing coil 28. Series-connected, normally closed switches 36, 32 and 34 are coupled between one side of switch 26 and a potential source or battery 30. An operator-controlled, normally open momentary contact switch 38 is preferably dash-mounted and coupled between the battery 30 and the relay coil 28. The other side of switch 26 and relay coil 28 are coupled together.

Switch 32 may be operatively coupled to a vehicle speed sensor 40 so that switch 32 will open when the vehicle speed exceeds a certain speed, such as 11 kilometers per hour.

Switches 34 and 36 are preferably operative in response to the application of the left and right brakes 42 and 44, such as is also described in U.S. Pat. No. 2,874,790.

The circuit 22 includes a subcircuit or multiple relay 46 which is coupled in parallel with the relay switch 26. Subcircuit 46 includes a manually controlled on/off switch 48 with one side coupled between switches 36 and 26 and with the other side coupled to one side of function controlled, normally open latching relays 50, 52 and a relay circuit 54. Normally open latching relays 56, 58 and 60 have switches which are coupled in series between switch 48 and relay 24.

Relay 50 is preferably operatively coupled to a draft force sensor 62 so that relays 50 and 56 will be latched closed whenever the sensed draft force is greater than a threshold draft of, for example, 10 kilo-newtons.

Relay 52 is preferably operatively coupled to a vehicle wheel slippage sensor 64 so that relays 52 and 58 will be latched closed whenever wheel slippage of the vehicles driven wheels exceeds, for example, 5%.

Relay 54 circuit is preferably operatively coupled to the vehicle steering system portion 66 so that relay 60 will be latched closed whenever a certain condition in the vehicle steering system exists.

Figure 2:
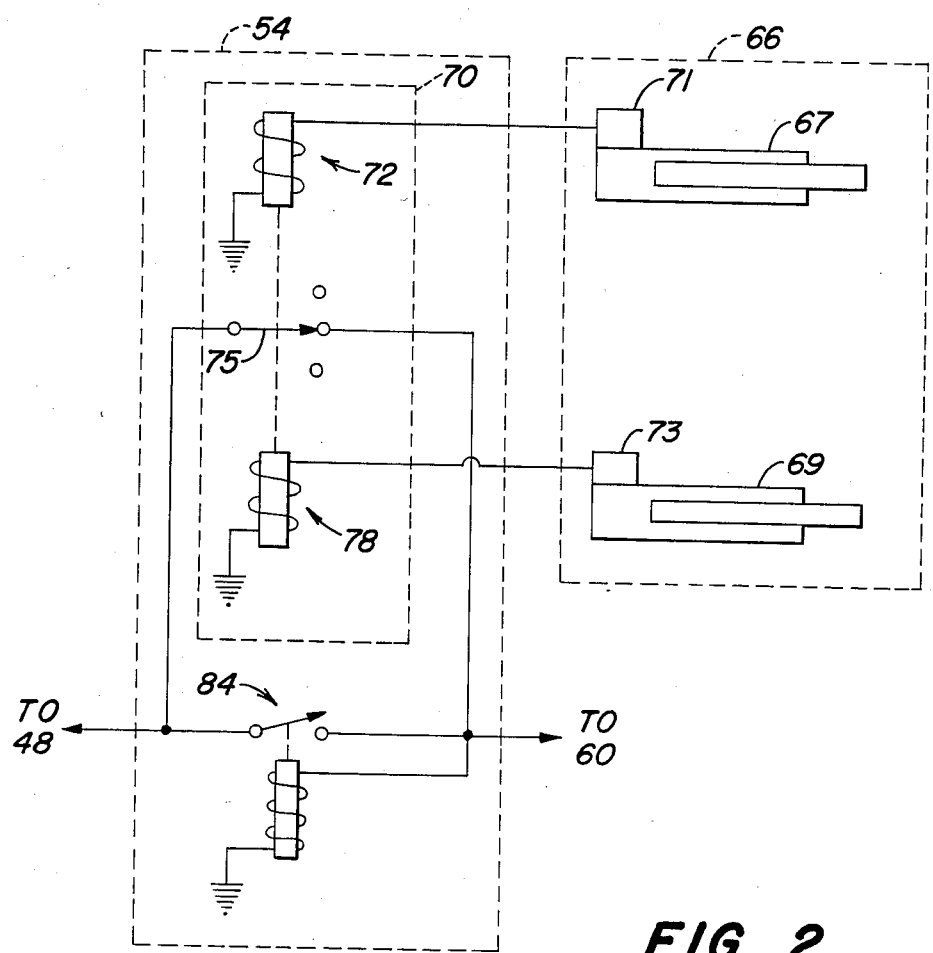
FIG. 2 is a schematic diagram of a steering-responsive portion of the present invention.

Referring now to FIG. 2, portion 66 of the steering system includes left and right hydraulically powered steering actuators 67 and 69, and corresponding fluid pressure sensors 71 and 73. Relay circuit 54 includes a normally closed dual solenoid-controlled relay 70 and a normally open latching relay 84. Solenoid 72 is preferably energized by a pressure sensor 71 when the hydraulic working pressure in steering actuator 67 exceeds a certain limit. Similarly, solenoid 78 is preferably energized by pressure sensor 73 when the pressure in steering actuator 69 exceeds this same limit. Thus, the relay switch 75 will be closed whenever the pressure in steering actuators 67 and 69 is substantially equalized, as is the case when only a small effort is required to steer the vehicle. The closing of switch 75 will cause normally open latching relay 84 to close, thus latching closed relay 60.

MODE OF OPERATION

An unlocked differential may be locked by momentarily closing switch 38. This connects the battery 30 to the solenoid and latches closed relay 24 so that solenoid 20 remains energized via normally closed switches 32, 34 or 36 after switch 38 is opened. This causes valve 18 to pressurize and lock the differential lock 12 in a well known manner.

If the vehicle speed exceeds 11 kph, or if either or both the left or right brakes 42 or 44 are applied (as when assisting steering), then the corresponding switches 32–36 will open, thus de-energizing solenoid 20 and opening relay 24 and unlocking the differential lock 12. Note, however, that when relay 24 is open, switches 32–36 cannot operate to close relay 24 since they cannot re-energize relay coil 28. Thus, switches 32–36 are operative to unlock the differential 10, but they are not operable to lock the differential 10.

If switch 48 is closed by the operator and switches 33–36 have re-closed, then subcircuit 46 can automatically re-close relay 24 and relock the differential lock 12 only if relays 56, 58 and 60 are simultaneously closed. This will occur only when the following conditions occur simultaneously:

1. Draft force is greater than 10 kn;
2. Wheel slip is less then 5%; and
3. Steering pressure in actuators 67 and 69 is substantially equalized.

Note that once relay 24 is closed and the differential 10 is locked, the opening or closing of relays 56, 58 and 60 will have no effect. Thus, subcircuit 46 is operative only to automatically re-lock the differential 10 and is not operable to unlock the differential 10. Note also that by opening switch 48, the operator can prevent subcircuit 46 from automatically relocking the differential.

While the invention has been described in conjuction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. In a vehicle having a differential and locking means for locking and unlocking the differential, a differential lock control system comprising:
   first means coupled to the locking means and responsive to a first vehicle function and operable only to automatically unlock the differential; and
   second means coupled to the locking means and responsive to at least a second vehicle function and operable only to automatically lock an unlocked differential, the second means automatically causing the locking means to lock the differential in response to a predetermined condition of a steering system of the vehicle, the second means being inoperative to unlock a locked differential.

2. In a vehicle having a differential and locking means for locking and unlocking the differential, a differential lock control system comprising:
   first means coupled to the locking means and responsive to a first vehicle function and operable only to automatically unlock the differential, the first means being responsive to vehicle braking to cause the locking means to unlock the differential when the vehicle is braked; and
   second means coupled to the locking means and responsive to at least a second vehicle function and operable only to automatically lock an unlocked differential, the second means automatically causing the locking means to lock the differential in response to a predetermined condition of a steering system of the vehicle, the second means being inoperative to unlock a locked differential.

3. The invention of claim 2, wherein the control system comprises:
   a latching relay having a relay switch coupled between the locking means and a potential source, the first means comprising a brake-operated, normally closed switch coupled between the potential source and the relay switch, the second means comprising a steering-responsive switch coupled between the potential source and the relay and operable only to close the relay switch in response to said predetermined condition, the locking means locking the differential only when connected to the potential source.

4. The invention of claim 3, wherein the control system further comprises:
   a normally open, momentary contact, operator-controlled switch coupled between the potential source and the relay and operable only to cause the locking means to lock the differential in response to operator closing thereof.

5. The invention of claim 3, wherein the control system further comprises:
   an operator-controlled on/off switch coupled between the potential source and the steering-responsive switch and operable to prevent closing of the relay switch in response to operation of the steering-responsive switch.

6. The invention of claim 3, wherein the control system further comprises:
   a vehicle speed sensor and;
   a speed-responsive switch coupled in series with the brake-operated switches and operative to unlock the differential when vehicle speed exceeds a predetermined minimum speed.

7. The invention of claim 3, wherein the second means further comprises:
   a vehicle wheel slip sensor; and
   a slip-responsive switch coupled in series with the steering-responsive switch and operable to lock the differential when second wheel slippage is less than a predetermined mimimum slippage.

8. The invention of claim 3, wherein the second means further comprises:
   a draft sensor for sensing draft forces applied to the vehicle; and
   a draft-responsive switch coupled in series with the steering-responsive switch and the slip-responsive switch and operable to prevent locking of the differential when sensed draft force is below a predetermined draft force.

9. The invention of claim 3, wherein the second means further comprises:
a vehicle wheel slip sensor;
a slip-responsive switch coupled in series with the steering-responsive switch and operable to lock the differential when sensed wheel slippage is less than a predetermined minimum slippage;
a draft sensor for sensing draft forces applied to the vehicle; and
a draft-responsive switch coupled in series with the steering-responsive switch and the slip-responsive switch and operable to prevent locking of the differential when sensed draft force is below a predetermined draft force.

10. In a vehicle having a differential and locking means for locking and unlocking the differential, a differential lock control system comprising:
first means coupled to the locking means and responsive to a first vehicle function and operable only to automatically unlock the differential; and
second means coupled to the locking means and responsive to at least a second vehicle function and operable only to automatically lock an unlocked differential, the second means comprising pressure sensors for sensing fluid pressures in hydraulically-operated steering systems of the vehicle, and means coupled to the pressure sensors and to the locking means for locking the differential when pressures sensed by the pressure sensors are substantially equal.

11. The invention of claim 10, wherein:
the pressure sensors sense working pressures in steering actuators of the steering system.

12. In a vehicle having a differential and locking means for locking and unlocking the differential, a differential lock control system comprising:
first means coupled to the locking means and responsive to a first vehicle function and operable only to automatically unlock the differential; and
second means coupled to the locking means and responsive to at least a second vehicle function and operable only to automatically lock an unlocked differential, the second means comprising a pressure sensor for sensing fluid pressure in an hydraulically-operated steering actuator of the vehicle, a first relay coupled to the pressure sensor and changing between first and second states in response to changes in the sensed pressure, a potential source, and a second relay operable in response to operation of the first relay to control communication between the potential source and the locking means, the locking means locking the differential when communicated with the potential source.

13. In a vehicle having a differential and locking means for locking and unlocking the differential, a differential lock control system comprising:
first means coupled to the locking means and responsive to a first vehicle function and operable only to automatically unlock the differential; and
second means coupled to the locking means and responsive to at least a second vehicle function and operable only to automatically lock an unlocked differential, the second means comprising first and second pressure sensors, each sensing fluid pressure in a corresponding one of first and second hydraulically-operated steering actuators of the vehicle, a normally-closed (N.C.) dual solenoid-operated relay having a switch controlled by first and second solenoids, each solenoid being operatively coupled to one of the pressure sensors, at least one of the solenoids operating to open the switch when the sensed pressures in the actuators are unbalanced by a predetermined amount, a potential source, a first normally-open (N.O.) relay coupled between the potential source and the locking means, the locking means locking the differential when the first normally open relay is closed, and a second N.O. relay coupled between the N.C. relay and the first N.O. relay and operable to close the first N.O. relay in response to closing of the N.C. relay.

* * * * *

UNITED STATES PATENT AND TRADEMARK OFFICE
CERTIFICATE OF CORRECTION

PATENT NO. : 4,549,448

DATED : 29 October 1985

INVENTOR(S) : Carl Edwin Kittle

It is certified that error appears in the above-identified patent and that said Letters Patent is hereby corrected as shown below:

Column 4, line 57, delete "second" and insert -- sensed --.

Signed and Sealed this

Twentieth Day of May 1986

[SEAL]

Attest:

DONALD J. QUIGG

Attesting Officer

Commissioner of Patents and Trademarks